(12) United States Patent
Yang et al.

(10) Patent No.: US 9,897,855 B2
(45) Date of Patent: Feb. 20, 2018

(54) DISPLAY PANEL AND DISPLAY APPARATUS

(71) Applicant: BOE Technology Group Co., Ltd., Beijing (CN)

(72) Inventors: Yafeng Yang, Beijing (CN); Jing Lv, Beijing (CN); Ming Zhu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 7 days.

(21) Appl. No.: 14/892,239

(22) PCT Filed: Mar. 25, 2015

(86) PCT No.: PCT/CN2015/075031
§ 371 (c)(1),
(2) Date: Nov. 19, 2015

(87) PCT Pub. No.: WO2016/082392
PCT Pub. Date: Jun. 2, 2016

(65) Prior Publication Data
US 2016/0357068 A1  Dec. 8, 2016

(30) Foreign Application Priority Data
Nov. 28, 2014 (CN) .......................... 2014 1 0713648

(51) Int. Cl.
*G02F 1/1335* (2006.01)
*G02F 1/1337* (2006.01)
(52) U.S. Cl.
CPC ...... *G02F 1/133621* (2013.01); *G02F 1/1337* (2013.01); *G02F 1/133504* (2013.01);
(Continued)
(58) Field of Classification Search
CPC .............................................. G02F 1/133621
See application file for complete search history.

(56) References Cited

U.S. PATENT DOCUMENTS

2011/0220929 A1* 9/2011 Collins .............. C09K 11/0883
257/98
2011/0261294 A1  10/2011 Jang et al.
(Continued)

FOREIGN PATENT DOCUMENTS

CN 103278876 A 9/2013
CN 103278961 A 9/2013
(Continued)

OTHER PUBLICATIONS

International Search Report and Written Opinion for International Application No. PCT/CN2015/075031, dated Aug. 21, 2015, 11 pages.
(Continued)

Primary Examiner — Edmond Lau
(74) Attorney, Agent, or Firm — Westman, Champlin & Koehler, P.A.

(57) ABSTRACT

Embodiments of the present invention disclose a display panel and a display apparatus so as to increase the optical conversion efficiency of the display panel. The display panel comprises: an array substrate and a color filter substrate which are arranged oppositely; a liquid crystal layer arranged between the array substrate and the color filter substrate; an upper polarizing layer provided between the color filter substrate and the liquid crystal layer; and a quantum dot excitation layer provided on the color substrate, wherein the upper polarizing layer is configured such that a first linearly polarized light transmitted through the upper polarizing layer irradiates on the quantum dot excitation layer. By disposing the upper polarizing layer between the color filter substrate and the liquid crystal layer, a first linearly polarized light transmitted through the upper polarizing layer arrives at the quantum dot excitation layer, then the quantum dot excitation layer is excited by the first
(Continued)

linearly polarized light and emits scattered light, the optical conversion efficiency of the display panel is thus increased.

15 Claims, 2 Drawing Sheets

(52) U.S. Cl.
CPC .. *G02F 1/133512* (2013.01); *G02F 1/133528* (2013.01); *G02F 1/133615* (2013.01); *G02F 1/13362* (2013.01); *G02F 1/133514* (2013.01); *G02F 1/133617* (2013.01); *G02F 2001/133565* (2013.01); *G02F 2201/52* (2013.01); *G02F 2202/36* (2013.01); *G02F 2203/055* (2013.01)

(56) References Cited

U.S. PATENT DOCUMENTS

| | | | |
|---|---|---|---|
| 2013/0010229 A1* | 1/2013 | Shin | G02F 1/133617 349/62 |
| 2013/0242228 A1* | 9/2013 | Park | G02F 1/133617 349/61 |
| 2015/0331165 A1* | 11/2015 | Ryu | G02B 5/223 362/610 |
| 2015/0331278 A1* | 11/2015 | Araki | G02F 1/133514 349/61 |
| 2016/0011506 A1 | 1/2016 | Gu et al. | |
| 2016/0070136 A1* | 3/2016 | Jang | G02F 1/133514 349/61 |

FOREIGN PATENT DOCUMENTS

| | | |
|---|---|---|
| CN | 103293745 A | 9/2013 |
| CN | 103412436 A | 11/2013 |
| CN | 203465442 U | 3/2014 |
| CN | 103709731 A | 4/2014 |
| CN | 103728837 A | 4/2014 |
| CN | 104330918 A | 2/2015 |
| CN | 204188921 U | 3/2015 |
| JP | 2006-310303 A | 11/2006 |
| WO | 2010/056240 A1 | 5/2010 |

OTHER PUBLICATIONS

English translation of Box No. V of the Written Opinion of the International Searching Authority for International Application No. PCT/CN2015/075031, 2 pages.
First Office Action, including Search Report, for Chinese Patent Application No. 201410713648.3, dated Aug. 30, 2016, 9 pages.
Second Office Action for Chinese Patent Application No. 201410713648.3, dated Jan. 22, 2017, 8 pages.
Second Office Action from Chinese Patent Application No. 20141063960.X, dated Mar. 13, 2017, 8 pages.

* cited by examiner

DISPLAY PANEL AND DISPLAY APPARATUS

CROSS-REFERENCE TO RELATED APPLICATION

This application is a Section 371 National Stage Application of International Application No. PCT/CN2015/075031, filed on Mar. 25, 2015, entitled "Display Panel and Display Apparatus", which has not yet been published, which claims priority to Chinese Application No. 201410713648.3, filed on Nov. 28, 2014, incorporated herein by reference in their entirety.

BACKGROUND OF THE INVENTION

Field of the Invention

Embodiments of the present invention relate to a display technical field, and in particular, to a display panel and a display apparatus.

Description of the Related Art

Quantum Dot (QD), also referred to as Nanocrystalline, is a kind of nano-particle consisting of group II-VI or III-V elements. A quantum dot generally has a particle size in a range of 1 nm to 20 nm. Since electrons and holes (cavities) in the quantum dot are quantum confined and a continuous energy band structure becomes a discrete energy level structure with molecule characteristic, the quantum dot can emit fluorescence after being excited. The emission spectrum of the QDs can be controlled by changing the size of the QDs, and the emission spectrum of the QDs can cover the whole visible light region by changing the size and the chemical composition of the QDs. Taking CdTe (Cadmium Telluride) QDs as an example, when the particle size is increased from 2.5 nm to 4.0 nm, their emission wavelength can red shift from 510 nm to 660 nm. Here, the red shift refers to a phenomenon that electromagnetic radiation from an object is increased in wavelength for certain reasons. In the visible spectrum, it shows that spectral lines are shifted to the red end of the spectrum by a certain distance, that is, the wavelength becomes longer and the frequency decreases.

The quantum dot has a high optical conversion efficiency which can significantly increase the utilization of light.

SUMMARY OF THE INVENTION

Embodiments of the present invention aim to provide a display panel and a display apparatus so as to increase the optical conversion efficiency of the display panel.

According to an embodiment of the present invention, it is provided a display panel comprising: an array substrate and a color filter substrate which are arranged opposite to each other; a liquid crystal layer arranged between the array substrate and the color filter substrate; an upper polarizing layer provided between the color filter substrate and the liquid crystal layer; and a quantum dot excitation layer provided on the color substrate, wherein the upper polarizing layer is configured such that first linearly polarized light transmitted through the upper polarizing layer irradiates on the quantum dot excitation layer.

In the embodiment of the present application, the upper polarizing layer is disposed between the color filter substrate and the liquid crystal layer, a first linearly polarized light transmitted through the upper polarizing layer arrives at the quantum dot excitation layer, then the quantum dot excitation layer is excited by the first linearly polarized light and emits scattered light, the optical conversion efficiency of the display panel is thus increased.

The display panel according to an embodiment of the present invention further comprises a lower polarizing layer provided on a surface of the array substrate away from the liquid crystal layer, a second linearly polarized light transmitted through the lower polarizing layer irradiating on the upper polarizing layer to produce the first linearly polarized light.

In the display panel according to an embodiment of the present invention, an absorption axis of the upper polarizing layer is orthogonal to that of the lower polarizing layer such that an initial display mode of the display panel is a normally black mode; or an absorption axis of the upper polarizing layer is parallel to that of the lower polarizing layer such that an initial display mode of the display panel is a normally white mode.

In the display panel according to an embodiment of the present invention, the upper polarizing layer and the lower polarizing layer are formed of polarizing films coated on the color filter substrate and the array substrate, respectively; or the upper polarizing layer and the lower polarizing layer are formed of polarizing sheets disposed on the color filter substrate and the array substrate, respectively. As such, the upper polarizing layer and the lower polarizing layer may be film layers secured on the respective substrates, or may also be adjustable polarizing sheets, increasing the compatibility of the display panel.

In the display panel according to an embodiment of the present invention, the quantum dot excitation layer comprises a red quantum dot film corresponding to a red sub-pixel, a green quantum dot film corresponding to a green sub-pixel and a transparent film corresponding to a blue sub-pixel, which are alternately arranged, and a blue filter layer is provided between the red quantum dot film as well as the green quantum dot film and the color filter substrate. As such, the quantum dot excitation layer comprising the red quantum dot film, the green quantum dot film and the transparent film is used as a color resistance to increase the optical conversion efficiency; meanwhile, the blue filter layer may filter the light transmitted through the red quantum dot film and the green quantum dot film, so as to prevent color mixture from occurring in the display panel.

The display panel according to an embodiment of the present invention further comprises an alignment layer provided between the upper polarizing layer and the liquid crystal layer, and a black matrix provided between the array substrate and the liquid crystal layer. As such, an alignment may be provided for the liquid crystal layer and the color mixture between quantum dot films may be decreased by utilizing the black matrix.

In the display panel according to an embodiment of the present invention, the black matrix is provided between the upper polarizing layer and the quantum dot excitation layer; or the black matrix is arranged between the quantum dot excitation layer and the color filter substrate; or the black matrix is provided between the array substrate and the alignment layer adjacent to the array substrate.

In the display panel according to an embodiment of the present invention, the red quantum dot film is formed by mixing red quantum dot particles with photoresist, the green quantum dot film is formed by mixing green quantum dot particles with photoresist, and the transparent film is formed by a transparent organic substance doped with scattered particles. The diameters of red quantum dot particles and green quantum dot particles are in a range of 2 to 6 microns, and the diameters of scattered particles are in a range of 2 to 10 nanometers In the display panel according to an embodiment of the present invention, red quantum dot particles and green quantum dot particles comprise CdTe particles or CdSe particles.

In the display panel according to the above embodiments of the present invention, the upper polarizing layer is provided between the color filter substrate and the liquid crystal layer, a backlight is polarized by the lower polarizing layer to form a second linearly polarized light which arrives at the upper polarizing layer firstly, and the second linearly polarized light is polarized by the upper polarizing layer to form the first linearly polarized light, thereafter, the first linearly polarized light arrives at the quantum dot excitation layer which performs a function of color resistance and is excited by the first linearly polarized light to emit scattered light, the optical conversion efficiency of the display panel is thus increased.

According to a further embodiment of the present invention, it is provided a display apparatus comprising: a display panel according to any of the above embodiments, and a backlight module provided on a side of the display panel where the array substrate is provided.

In the display apparatus according to an embodiment of the present invention, the backlight module is a blue backlight module.

In the display panel according to the above embodiments of the present invention, the upper polarizing layer is provided between the color filter substrate and the liquid crystal layer, the backlight is polarized by the lower polarizing layer to form a second linearly polarized light which arrives at the upper polarizing layer firstly, and the second linearly polarized light is polarized by the upper polarizing layer to form the first linearly polarized light, thereafter, the first linearly polarized light arrives at the quantum dot excitation layer which performs a function of color resistance and is excited by the first linearly polarized light to emit scattered light, the optical conversion efficiency of the display panel is thus increased. Further, the backlight module may provide blue backlight so as to cooperate with the quantum dot films in the display panel, so that the optical conversion efficiency of the display panel is further increased.

Figure 1:
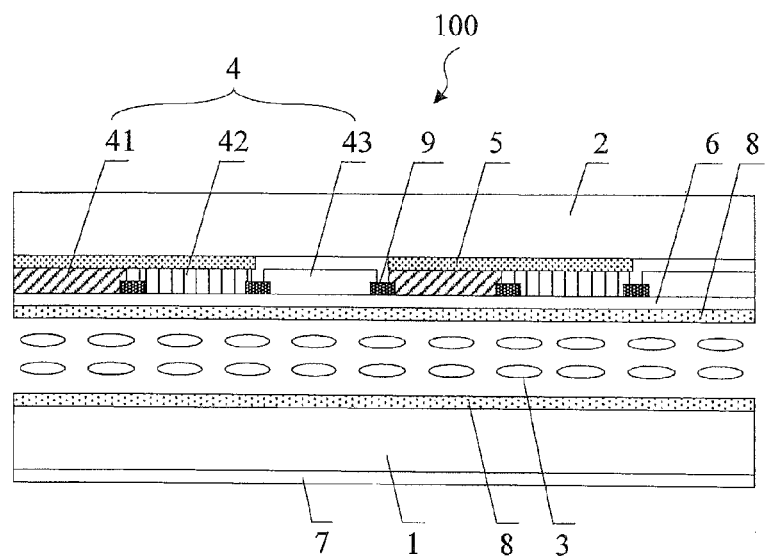
FIG. 1 is a schematic partial section view of a display panel according to a first exemplary embodiment of the present invention.

DETAILED DESCRIPTION OF PREFERRED
EMBODIMENTS OF THE INVENTION

Next, specific implementations of the present invention will be further described in detail in combination with drawings. It should be noted that the same or similar reference numerals refer to the same or similar elements or elements having the same or similar functions throughout the drawings. The following embodiments described referring to the drawings are exemplary and merely used to explain the present invention, but not to limit the scope of the present invention.

In addition, in the following detailed description, in order to facilitate the explanation, a number of specific details are explained to provide a comprehensive understanding to the embodiments disclosed in the present invention. However, it is obvious that one or more embodiments may be implemented without these specific details. In other cases, conventional structures and devices are shown in schematic diagrams to simplify the drawings.

According to a general concept of the present invention, it is provided a display panel comprising: an array substrate and a color filter substrate which are arranged opposite to each other; a liquid crystal layer arranged between the array substrate and the color filter substrate; an upper polarizing layer provided between the color filter substrate and the liquid crystal layer; and a quantum dot excitation layer provided on the color substrate, wherein the upper polarizing layer is configured such that a first linearly polarized light transmitted through the upper polarizing layer irradiates on the quantum dot excitation layer.

Referring to FIG. 1, a display panel 100 according to a first exemplary embodiment of the present invention comprises an array substrate 1 and a color filter substrate 2 which are arranged oppositely, and a liquid crystal layer 3 arranged between the array substrate 1 and the color filter substrate 2.

Further, a quantum dot excitation layer 4 is provided on the color filter substrate 2, an upper polarizing layer 6 is provided between the color filter substrate 2 and the liquid crystal layer 3 and is disposed upstream of the quantum dot excitation layer 4 in a direction of light transmission, so that a first linearly polarized light transmitted through the upper polarizing layer 6 irradiates on the quantum dot excitation layer 4.

In the display panel according to the embodiment of the present invention, the upper polarizing layer is disposed between the color filter substrate and the liquid crystal layer, so that a first linearly polarized light transmitted through the upper polarizing layer 6 arrives at the quantum dot excitation layer, then the quantum dot excitation layer is excited by the first linearly polarized light and emits scattered light, the optical conversion efficiency of the display panel is thus increased.

According to an embodiment of the present invention, a lower polarizing layer 7 is provided on a surface of the array substrate 1 which is not adjacent to the liquid crystal layer 3, that is, the lower polarizing layer 7 is provided on a surface of the array substrate 1 away from the liquid crystal layer 3. As such, a second linearly polarized light transmitted through the lower polarizing layer 7 may continue to arrive at the quantum dot excitation layer 4 in a linearly polarized light state (i.e. the first linearly polarized light) through the upper polarizing layer 6.

It should be noted that the upper polarizing layer 6 is generally provided between the color filter substrate 2 and the liquid crystal layer 3, in other words, the upper polarizing layer 6 is disposed upstream of the quantum dot excitation layer 4 in a path of backlight transmitted in the display panel. Such an arrangement is made for the following reasons: if the upper polarizing layer 6 is disposed downstream of the quantum dot excitation layer 4 in a path of backlight transmitted in the display panel, then during the display of the display panel, the lower polarizing layer 7 will polarize the backlight to obtain a second linearly polarized light; if the second linearly polarized light arrives at the quantum dot excitation layer 4 without being transmitted through the upper polarizing layer 6, it will be scattered by the quantum dot excitation layer 4 to form an elliptical polarized light; the elliptical polarized light will be blocked when it arrives at the upper polarizing layer 6, which causes that the display panel 100 is not able to display image. Thus, the upper polarizing layer 6 has to be disposed upstream of the quantum dot excitation layer 4 in a path of backlight transmitted in the display panel. In the embodiment of the present invention, the upper polarizing layer 6 is provided between the color filter substrate 2 and the liquid crystal layer 3, the backlight from a backlight module 300 (FIG. 4) is polarized by the lower polarizing layer 7 to form a second linearly polarized light which arrives at the upper polarizing layer 6 firstly, and the second linearly polarized light is polarized by the upper polarizing layer 6 to form the first linearly polarized light, thereafter, the first linearly polarized light arrives at the quantum dot excitation layer 4, then the quantum dot excitation layer 4 is excited by the first linearly polarized light so as to emit scattered light, thus the optical conversion efficiency of the display panel is increased.

In the embodiment, the quantum dot excitation layer 4 comprises a red quantum dot film 41 corresponding to a red sub-pixel, a green quantum dot film 42 corresponding to a green sub-pixel and a transparent film 43 corresponding to a blue sub-pixel, which are spaced apart from each other. A blue filter layer 5 is provided between the red quantum dot film 41 as well as the green quantum dot film 42 and the color filter substrate 2. In the embodiment, the quantum dot excitation layer 4 comprising the red quantum dot film 41, the green quantum dot film 42 and the transparent film 43 is used as a color resistance, specifically, the red quantum dot film 41 may allow the transmission of red light, the green quantum dot film 42 may allow the transmission of green light, and the transparent film 43 may allow the transmission of blue light if the backlight is blue light. As the red quantum dot film 41 and the green quantum dot film 42 may allow transmission of apart of blue light, the blue filter layer 5 is provided to filter the blue light transmitted through the red quantum dot film 41 and the green quantum dot film 42, so as to avoid color mixture during the display of the display panel 100. It should be noted that the embodiment is explained by taking blue light as an example of backlight, however, it should be appreciated that it is only necessary to provide a blue quantum dot film for the quantum dot excitation layer 4 to correspond to a blue sub-pixel if the backlight is white light, which is omitted here.

In an embodiment, an absorption axis of the upper polarizing layer 6 is orthogonal or parallel to that of the lower polarizing layer 7. A normal display mode may be a normally black mode if an absorption axis of the upper polarizing layer 6 is orthogonal to that of the lower polarizing layer 7; a normal display mode may be a normally white mode if an absorption axis of the upper polarizing layer 6 is parallel to that of the lower polarizing layer 7.

In an embodiment, the upper polarizing layer 6 and the lower polarizing layer 7 are polarizing films coated on the color filter substrate 2 and array substrate 1, respectively, that is, the upper polarizing layer 6 and the lower polarizing layer 7 are film layers formed on the color filter substrate 2 and array substrate 1, respectively. In this case, they are secured on the color filter substrate 2 and array substrate 1, which facilitates decreasing the thickness of the display panel. Alternatively, the upper polarizing layer 6 and the lower polarizing layer 7 may be polarizing sheets disposed on the color filter substrate 2 and array substrate 1, respectively, that is, the upper polarizing layer 6 and the lower polarizing layer 7 are polarizing sheets which are separable from the color filter substrate 2 and array substrate 1, respectively. Such a configuration facilitates preparing components separately and then assembling them together to form an assembly.

In an embodiment, the display panel 100 further comprises an alignment layer 8 and a black matrix 9. The alignment layers 8 are disposed between the upper polarizing layer 6 and the liquid crystal layer 3, and between the array substrate 1 and the liquid crystal layer 3. The black matrixes 9 are disposed on the color filter substrate 2 or the array substrate 1, for covering gaps between adjacent monochrome film layers, for example, the red quantum dot film 41, the green quantum dot film 42 and the transparent film 43, of the quantum dot excitation layer 4.

Figure 2:
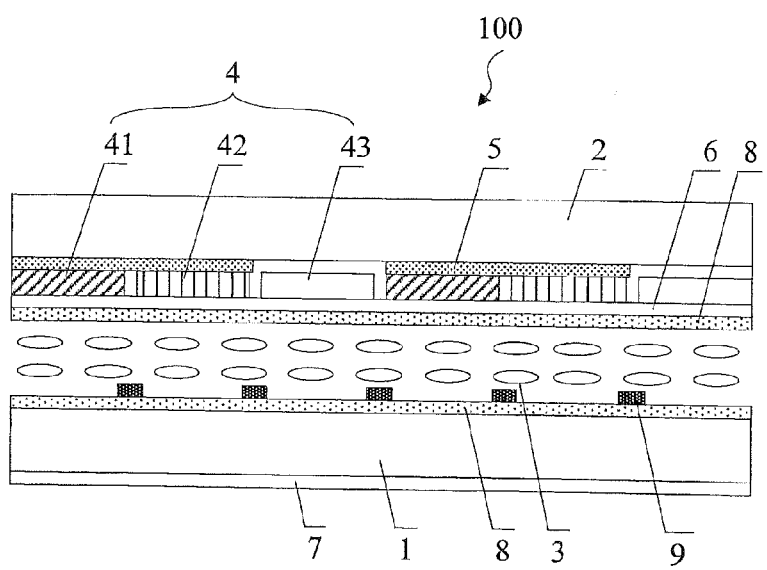
FIG. 2 is a schematic partial section view of a display panel according to a second exemplary embodiment of the present invention.

In an embodiment, the black matrix 9 is disposed between the upper polarizing layer 6 and the quantum dot excitation layer 4, as shown in FIG. 1. In an alternative embodiment, the black matrix 9 is disposed between the alignment layer 8 and the array substrate 1, as shown in FIG. 2, in which the same reference numerals as FIG. 1 are used. The width of the blue filter layer 5 is greater than or equal to the total width of the adjacent red quantum dot film 41 and green quantum dot film 42, that is, the blue filter layer 5 disposed between the adjacent red quantum dot film 41 and green quantum dot film 42 and the color filter substrate 2 fully covers the adjacent red quantum dot film 41 and green quantum dot film 42. In the embodiment, the blue filter layer 5 can fully cover the adjacent red quantum dot film 41 and green quantum dot film 42 without covering the transparent film 43, so that the blue light transmitted through the red quantum dot film 41 and the green quantum dot film 42 is filtered while the blue light transmitted through the transparent film 43 is not affected, which prevents a color mixture from occurring in the display panel.

Figure 3:
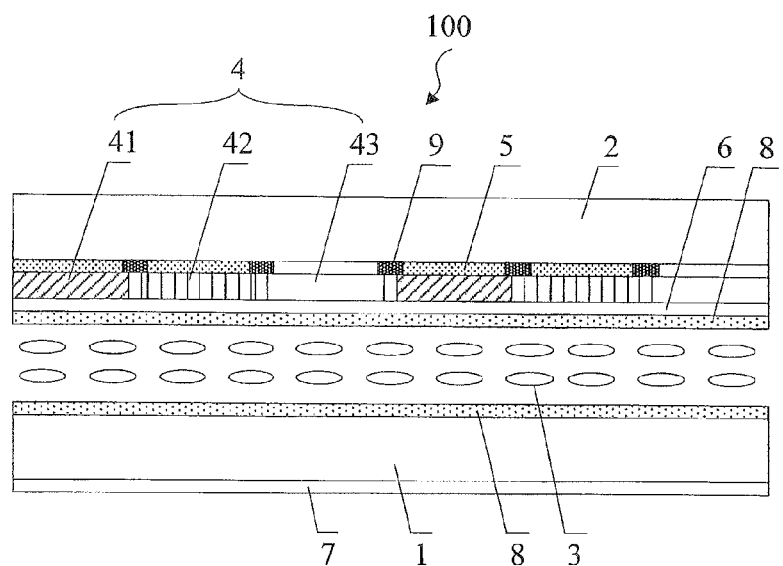
FIG. 3 is a schematic partial section view of a display panel according to a third exemplary embodiment of the present invention.

In another alternative embodiment, the black matrix 9 is disposed between the quantum dot excitation layer 4 and the color filter substrate 2, as shown in FIG. 3, in which the same reference numerals as FIG. 1 are used. In the embodiment, the black matrix 9 may be positioned at a terminal position in a path of backlight transmitted in the display panel during manufacturing the display panel, which facilitates covering various wires and is able to avoid the color mixture between the adjacent quantum dot excitation layers 4 to a maximum extend.

In an embodiment, the red quantum dot film 41 is formed by mixing red quantum dot particles with photoresist, the green quantum dot film 42 is formed by mixing green quantum dot particles with photoresist, and the diameters of red quantum dot particles and green quantum dot particles may be in a range of 2 to 6 microns; the transparent film 43 is formed by a transparent organic substance doped with scattered particles which have a diameter in a range of 2 to 10 nanometers. The scattered particle may be formed by organic material, or also may be formed by inorganic material. For example, the scattered particles may be formed by a material which has a refractive index which is much greater than or is much less than the transparent organic substance.

In an embodiment, the red quantum dot particles and the green quantum dot particles comprise CdTe particles or CdSe particles.

In the display panel according to various embodiments of the present invention, the upper polarizing layer 6 is disposed between the color filter substrate 2 and the liquid crystal layer 3, the backlight is polarized by the lower polarizing layer 7 to form the second linearly polarized light which arrives at the upper polarizing layer 6 firstly, then the second linearly polarized light is polarized by the upper polarizing layer 6 to form the first linearly polarized light, thereafter, the first linearly polarized light arrives at the quantum dot excitation layer 4 which performs a function of color resistance and is excited by the first linearly polarized light to emit scattered light, the optical conversion efficiency of the display panel 100 is thus increased.

Figure 4:
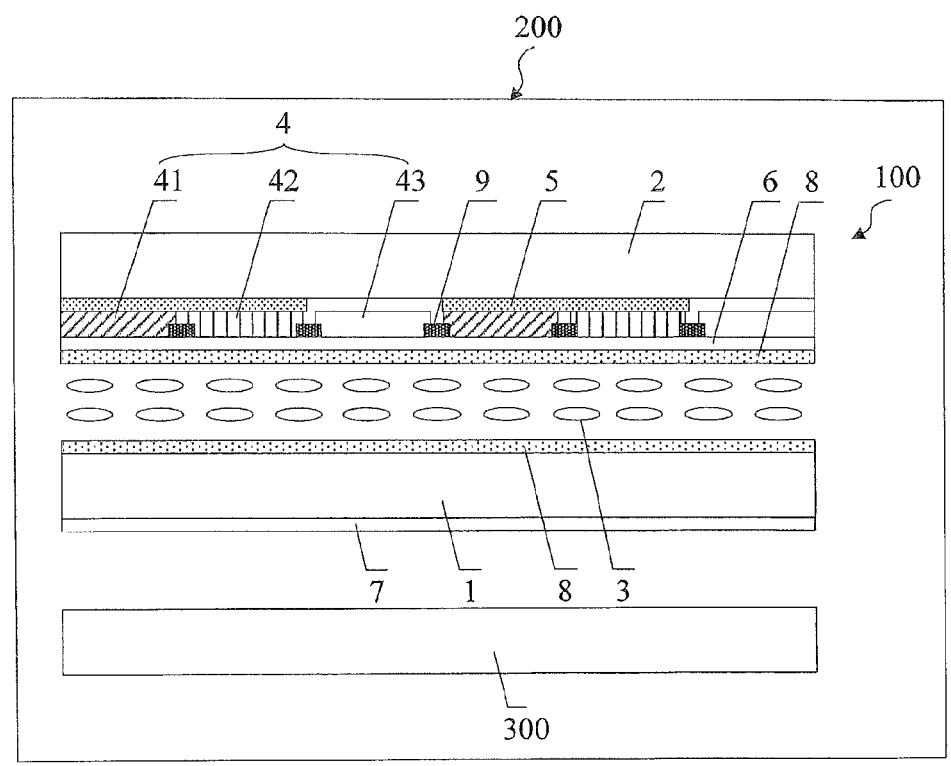
FIG. 4 is a schematic partial section view of a display apparatus according to an embodiment of the present invention.

Referring to FIG. 4, according to a further embodiment of the present invention, a display apparatus 200 is provided. The display apparatus 200 comprises a display panel 100 according to any of above embodiments and a backlight module 300, and the backlight module 300 is disposed on a side of the display panel 100 where the array substrate 1 is located.

In an embodiment, the backlight module 300 is a blue backlight module. In the embodiment, a spectrum of the light emitting from the blue backlight module has a wavelength in a range of 400 to 490 nanometers. Typically, the light emitting from the backlight module 300 is a light with a single wavelength in a range of 450 to 460 nanometers. In the embodiment, the blue light emitted from the backlight module 300 may be used as a stable excitation light for exciting quantum dots in the quantum dot excitation layer 4 disposed on the color filter substrate 2.

In the display panel and the display apparatus according to various embodiments of the present invention, the upper polarizing layer 6 is disposed between the color filter substrate 2 and the liquid crystal layer 3, the backlight is polarized by the lower polarizing layer 7 to form the second linearly polarized light which arrives at the upper polarizing layer 6 firstly, then the second linearly polarized light is polarized by the upper polarizing layer 6 to form the first linearly polarized light, thereafter, the first linearly polarized light arrives at the quantum dot excitation layer 4 which performs a function of color resistance and is excited by the first linearly polarized light to emit scattered light, the optical conversion efficiency of the display panel 100 is thus increased. Further, the backlight module 300 may provide blue backlight so as to cooperate with the quantum dot excitation layer 4 in the display panel 100, so that the optical conversion efficiency of the display panel is further increased.

Obviously, various modifications and changes may be made to the embodiments of the present invention by those skilled in the art without departing from the spirit and scope of the present invention. Thus, these modifications and changes are intended to be included in the present invention if they fall into the claims of the present invention and the equivalent technology thereof.

What is claimed is:

1. A display panel comprising:
   an array substrate and a color filter substrate which are arranged opposite to each other;
   a liquid crystal layer arranged between the array substrate and the color filter substrate;
   an upper polarizing layer provided between the color filter substrate and the liquid crystal layer;
   a quantum dot excitation layer provided on the color substrate, and
   a plurality of black matrices provided between the quantum dot excitation layer and the color filter substrate,
   wherein the upper polarizing layer is configured such that a first linearly polarized light transmitted through the upper polarizing layer irradiates on the quantum dot excitation layer,
   wherein the quantum dot excitation layer comprises a red quantum dot film corresponding to a red sub-pixel, a green quantum dot film corresponding to a green sub-pixel and a transparent film corresponding to a blue sub-pixel, which are alternately arranged, a first blue filter layer is provided between the red quantum dot film and the color filter substrate, and a second blue filter layer is provided between the green quantum dot film and the color filter substrate, and
   wherein the black matrices are provided between the first blue filter layer and the second blue filter layer, and at the ends of the first blue filter layer and the second blue filter layer facing away from each other, respectively.

2. The display panel according to claim 1, further comprising a lower polarizing layer provided on a surface of the array substrate away from the liquid crystal layer, a second linearly polarized light transmitted through the lower polarizing layer irradiating on the upper polarizing layer to produce the first linearly polarized light.

3. The display panel according to claim 2, wherein
   an absorption axis of the upper polarizing layer is orthogonal to that of the lower polarizing layer such that an initial display mode of the display panel is a normally black mode; or
   an absorption axis of the upper polarizing layer is parallel to that of the lower polarizing layer such that an initial display mode of the display panel is a normally white mode.

4. The display panel according to claim 3, wherein
   the upper polarizing layer and the lower polarizing layer are formed of polarizing films coated on the color filter substrate and the array substrate, respectively; or
   the upper polarizing layer and the lower polarizing layer are formed of polarizing sheets disposed on the color filter substrate and the array substrate, respectively.

5. The display panel according to claim 1, wherein the red quantum dot film is formed by mixing red quantum dot particles with photoresist, the green quantum dot film is formed by mixing green quantum dot particles with photoresist, and the transparent film is formed by a transparent organic substance doped with scattered particles.

6. The display panel according to claim 5, wherein the diameters of the red quantum dot particles and the green quantum dot particles are in a range of 2 microns to 6 microns, and the diameters of the scattered particles are in a range of 2 nanometers to 10 nanometers.

7. The display panel according to claim 6, wherein the red quantum dot particles and the green quantum dot particles comprise CdTe particles or CdSe particles.

8. The display panel according to claim 1, further comprising:
   an alignment layer provided between the upper polarizing layer and the liquid crystal layer.

9. A display apparatus comprising:
   a display panel according to claim 1; and
   a backlight module provided on a side of the display panel where the array substrate is disposed.

10. The display apparatus according to claim 9, wherein the backlight module is a blue backlight module.

11. The display panel according to claim 2, further comprising:
    an alignment layer provided between the upper polarizing layer and the liquid crystal layer; and
    a black matrix provided between the array substrate and the liquid crystal layer.

12. The display panel according to claim 3, further comprising:

an alignment layer provided between the upper polarizing layer and the liquid crystal layer; and a black matrix provided between the array substrate and the liquid crystal layer.

13. The display panel according to claim 4, further comprising:

an alignment layer provided between the upper polarizing layer and the liquid crystal layer; and a black matrix provided between the array substrate and the liquid crystal layer.

14. The display panel according to claim 1, further comprising: an alignment layer provided between the upper polarizing layer and the liquid crystal layer; and a black matrix provided between the array substrate and the liquid crystal layer.

15. The display panel according to claim 5, further comprising:

an alignment layer provided between the upper polarizing layer and the liquid crystal layer; and a black matrix provided between the array substrate and the liquid crystal layer.

* * * * *